United States Patent [19]
Kearns

[11] Patent Number: 4,516,229
[45] Date of Patent: May 7, 1985

[54] OSCILLATOR PROXIMITY SWITCH

[76] Inventor: William F. Kearns, 177 E. Weber Rd., Columbus, Ohio 43202

[21] Appl. No.: 406,309

[22] Filed: Aug. 9, 1982

[51] Int. Cl.³ .......................... G01S 15/08; G01S 7/52
[52] U.S. Cl. ........................................ 367/95; 367/96; 367/99
[58] Field of Search ............... 367/2, 95, 96, 114, 367/117, 118, 133, 93, 99

[56] References Cited
U.S. PATENT DOCUMENTS

| | | | |
|---|---|---|---|
| 2,333,688 | 11/1943 | Shepard, Jr. | 367/114 |
| 3,031,644 | 4/1962 | Hisserich et al. | 367/95 |
| 3,065,455 | 11/1962 | Roth | 367/95 |
| 3,597,754 | 8/1971 | Lerner | 367/95 |
| 3,729,702 | 4/1973 | Beeken et al. | 367/95 |
| 3,881,353 | 5/1975 | Fathauer | 367/95 |
| 4,260,980 | 4/1981 | Bates | 367/95 |
| 4,263,665 | 7/1981 | Watts | 367/94 |
| 4,290,126 | 9/1981 | McFadyen et al. | 367/93 |

FOREIGN PATENT DOCUMENTS 2057150  5/1972  Fed. Rep. of Germany ........ 367/96

*Primary Examiner*—Richard A. Farley

[57] ABSTRACT

An acoustic distance measuring system for detecting a small change in position of a remote object and changing the state of a relay. An acoustic transmitter and receiver are connected by an amplifier circuit which is induced into oscillation when a portion of the transmitted acoustic signal is reflected by a remote surface back to the receiver, forming an external feedback path, said oscillations occurring only in alternate half wavelengths of feedback path length, in which the reflected waves are generally in phase with the transmitted waves. A detector circuit responsive to the amplifier oscillations provides an output which is used to change the state of a relay.

5 Claims, 5 Drawing Figures

4,516,229

OSCILLATOR PROXIMITY SWITCH

BACKGROUND OF THE INVENTION

This invention reslates to acoustic distance measuring devices in general, and in particular to a novel type of ultrasonic distance measuring apparatus employing self-oscillation in alternate half-wavelengths of feedback path length.

Several types of acoustic distance measuring devices are in use, the most common being variations of the pulse-echo system, which bounces ultrasonic pulses from a surface and uses a timing circuit to measure the elapsed time between the pulse transmission and the return of the echo. By knowing the velocity of sound and the travel time, the distance to the reflecting surface can be determined. Some devices include complex reference system to compensate for changes in the velocity of sound or variations in the timing circuit.

Pulse-echo systems are limited in their ability to sense small changes in distance, as the accuracy of the timing circuit is limited. These systems tend to be relatively complex and expensive.

SUMMARY OF THE INVENTION

An acoustic distance measuring system comprising an acoustic receiver means, an acoustic transmitter means, an amplifier means, a detector means, and a relay means. The said receiver means, transmitter means, and amplifier means are arranged in a conventional amplifier circuit wherein the acoustic receiver means generates electrical signals in response to acoustic waves incident thereupon, said electrical signals being passed to the input of said amplifier, which amplifies said electrical signals and generates an output signal, said output signal being passed to the said acoustic transmitter means, which generates acoustic waves in response thereto.

The acoustic receiver means and acoustic transmitter means are located side-by-side with an acoustic barrier between them to prevent direct feedback, oriented along parallel axes, so that when a reflecting surface is present in front of them a feedback path for acoustic waves is established, with acoustic waves generated by said tramsitter means being reflected back to said receiver means. When the reflected waves are in phase with the transmitted waves, or not more than plus or minus ninety degrees out of phase, so that the reflected waves are generally reinforcing the transmitted waves, resonance occurs, and the amplifier is induced into oscillation, the frequency of said oscillations being a characteristic of the amplifier circuit. Thus, the detection field in front of the apparatus is a series of oscillatory live bands and non-oscillatory dead bands, each approximately one-half wavelength wide.

The detector means is a conventional tone decoder integrated circuit which has its center frequency set at the characteristic amplifier oscillation frequency, and which receives its input from the output of the said receiver means. When the said characteristic amplifier oscillation frequency is present at the said tone decoder input, said decoder makes it output terminal go low, allowing current to flow in a relay coil circuit, energizing said relay and changing the state of the said relay contacts, which may be used to energize an external load.

The object of the present invention is to provide a non-contact distance measuring system to detect a relatively small change in distance to a reflecting object and controlling an external load in response thereto.

DESCRIPTION OF THE PREFERRED EMBODIMENT

Figure 1:
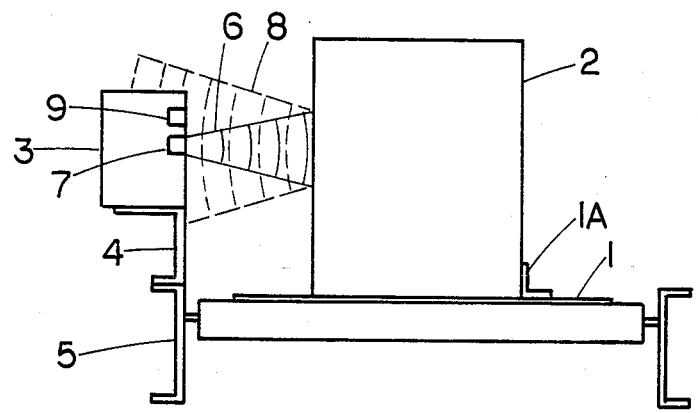
FIG. 1 depicts the present invention measuring a carton moving on a flat belt conveyor.

An ultrasonic distance measuring system in accordance with this invention, is shown in FIG. 1, which is a cross-sectional view of a flat belt converyor 1 such as might be used for transporting cardboard cartons 2 in an industrial plant or warehouse. The cartons are positioned by cleat 1A on the belt. The present invention, referenced generally as 3, is mounted by a suitable bracket 4 to the frame channel 5 of the conveyor. The drawing shows a typical conical pattern of acoustic waves 6 which might be produced by the acoustic transmitter 7 when the amplifier is in a state of oscillation. In this application, the present invention is used to provide a tolerance check on the width of the carton. The reflected waves 8 are sensed by acoustic receiver 9. The system is initially set up so that the reflecting surface of the carton 2 falls into a non-oscillatory dead band. Cartons of the correct width will not trigger oscillations. A carton which is one-quarter wavelength too wide or too narrow will fall into a live band and cause oscillations.

Figure 2:
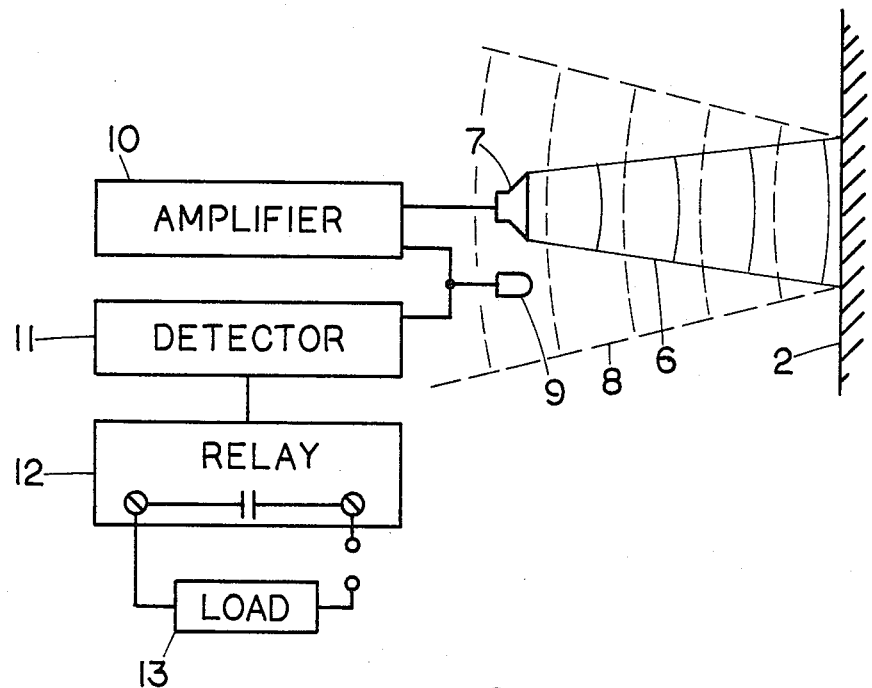
FIG. 2 is a block diagram illustrating the oscillator proximity switch apparatus of the present invention.

FIG. 2 is a block diagram of the present invention. With the amplifier 10 in a state of oscillation, an electrical signal is present at the amplifier output and is passed to the acoustic transmitter 7, which generates acoustic waves 6, which are reflected from the detection surface 2. A portion of the reflected waves 8 is received by the acoustic receiver 9, which generates an electrical signal which is passed to the input of the amplifier 10. The acoustic transmitter 7 and acoustic receiver 9 are shown oriented along parallel axes, but could be oriented in any fashion which provides a feedback path.

A detector circuit 11 monitors the output of the acoustic receiver 9. When the amplifier 10 is in a state of oscillation, a characteristic frequency is present at the receiver 9 output. The detector circuit is a tone decoder selectively responsive to the frequency of oscillation of the amplifier 10. When the detector circuit 11 senses this frequency, it operates the relay 12. The load 13 is wired throught the contacts in the relay 12. If the load power is AC, a triac or SCR may replace the relay 12.

Figure 3:
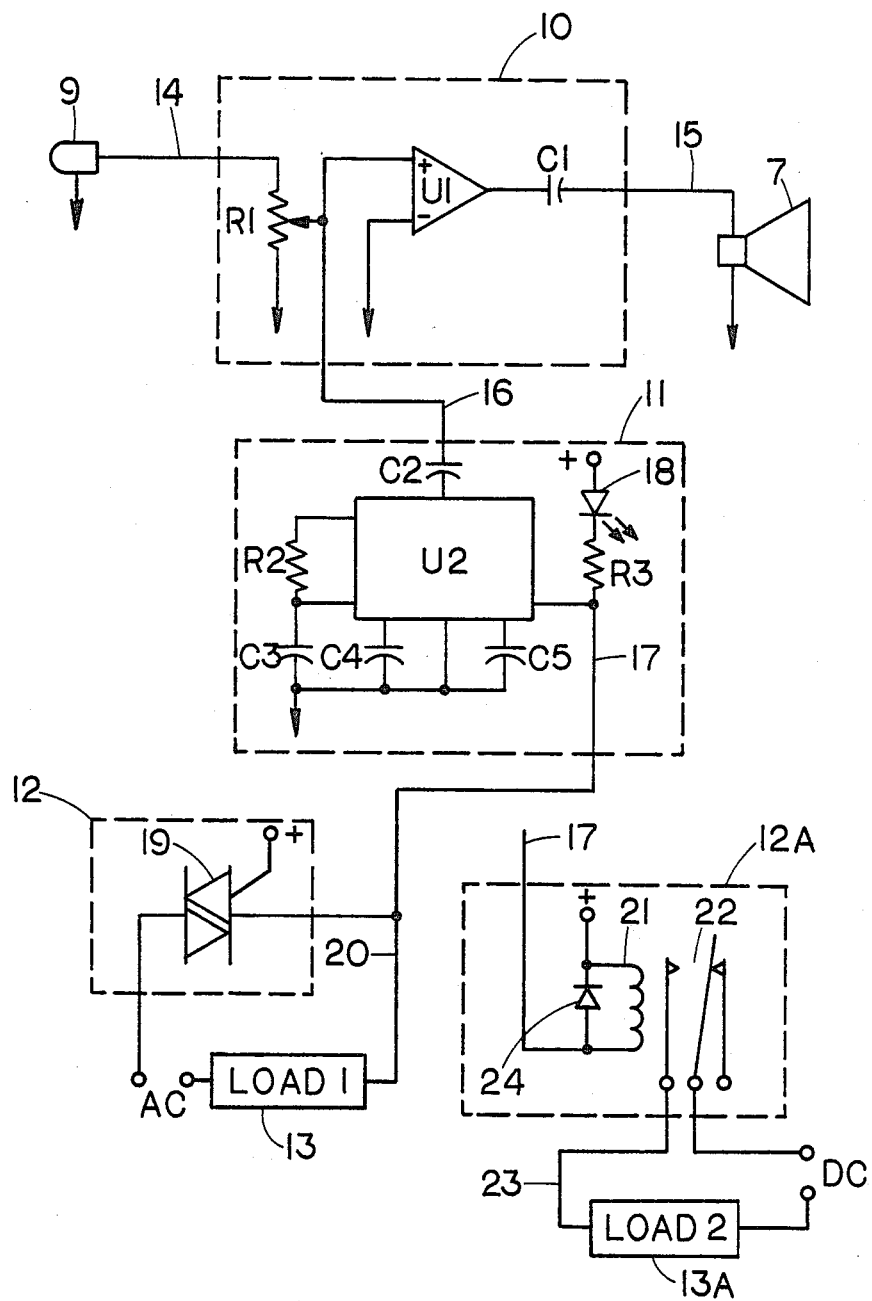
FIG. 3 is a schematic diagram illustrating the apparatus of the present invention in greater detail.

FIG. 3 is a circuit diagram of the present invention. The acoustic receiver 9 are responsive to acoustic waves and generates an electrical signal which is passed to amplifier 10 on line 14. Potentiometer R1 adjusts the amplifier 10 input voltage. Amplifier U1 amplifies the signal and provides an output on line 15 which is coupled to the acoustic transmitter 7 by coupling capacitor C1. The acoustic transmitter 7 converts the electrical signals into acoustic waves.

The detector circuit 11 monitors the output of the acoustic receiver 9 through line 16 and capacitor C2. Tone decoder U2 has its center frequency set by resistor R2 and capacitor C3 and its detection bandwidth by the supply voltage and the low pass filter capacitor C4. Capacitor C5 prevents spurious outputs. When the input frequency on line 16 matches the center frequency of tone decoder U2, the output on line 17 is made low, which allows current to flow in the output circuit. An indicator light emitting diode 18 is used to signal when detection occurs. Resistor R3 limits the current through the LED 18.

FIG. 3 shows two relay means, 12 and 12A, which are preferred for switching AC and DC respectively. In 12, the detector output on line 17 allows current to flow into the gate terminal of triac 19, triggering it into conduction, allowing AC current to flow in line 20, energizing AC Load 1, referenced as 13. In the relay circuit 12A, the detector output on line 17 is connected to the coil of an electromechanical relay 21, energizing the coil when U2 output goes low. When the relay coil 21 is energized the relay contacts 22 close, allowing DC current to flow in line 23, energizing DC Load 2, referenced as 13A. Diode 24 dissipates the current released by the coil when it is deenergized, protecting U2.

Figure 4A:
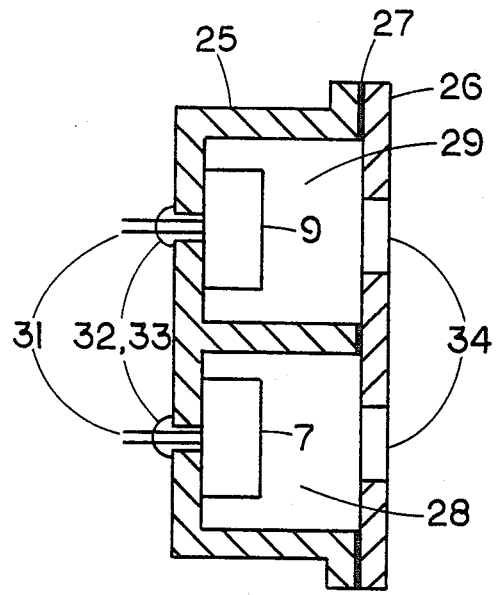
FIG. 4A is a cross-sectional view of the transducer housing employed in the present invention.
Figure 4B:
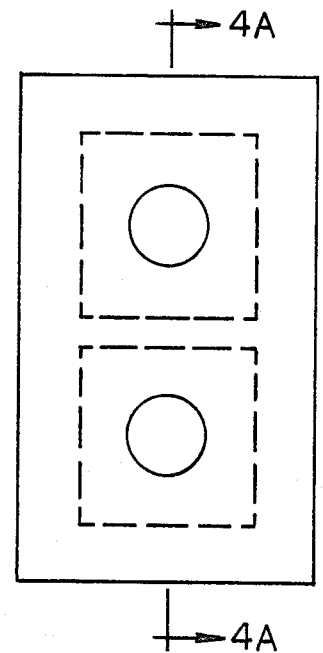
FIG. 4B is a front view of the transducer housing.

FIGS. 4A and 4B show the mounting of the acoustic transmitter 7 and acoustic receiver 9 in more detail. The housing 25 and cover 26 are made of material which will block acoustic waves, such as lead or high density polymer. An elastomer gasket 27 seals the joint between the housing 25 and cover 26. The housing 25 is constructed with two cavities 28 and 29 which are square in cross section on the drawing but may be round or rectangular. The and upper cavity 29 contain the acoustic receiver 9 while the lower cavity 28 contains the acoustic transmitter 7.

The electrical wires 31 pass through two holes 32 into the respective cavities. The holes 32 are closed with grommets 33 to prevent unwanted leakage of acoustic waves.

FIG. 4B shows a front view of the cover 26, which has two holes 34, one located in the center of each of the cavities 28 and 29. These holes acts as acoustic guides to improve the directionality and limit the detection field of the invention. More complex acoustic guides may be employed to further shape the detection field.

While the above descriptions include many specificities, these should not be construed as limitations on the scope of the invention, but rather as an exemplification of two preferred embodiments thereof. Many other variations are possible, for example, The tone decoder may be replaced with a level detector circuit to monitor the voltage in the amplifier circuit. To prevent false outputs, a bandpass filter must be used ahead of the level detector input to pass only the amplifier oscillation frequency.

I claim:

1. An acoustic distance measuring system wherein a remote surface reflects acoustic waves from a transmitter back to a receiver, completing a feedback loop, inducing oscillation in the system when the reflected waves are generally in phase with and reinforcing the transmitted waves, said oscillations rapidly dying out when the reflected waves are roughly one-half wavelength out of phase with the transmitted waves, so that the reflected waves are generally cancelling the transmitted waves, the presence or absence of said oscillations being employed to detect a relatively small change in the position of the remote reflecting surface; comprising a transmitter means for generating acoustic waves; a receiver means oriented to receive acoustic waves from said transmitter after said waves are reflected by a remote surface; an amplifier means which receives its input from the said receiver means and passes its output to the said transmitter means and which oscillates at a characteristic frequency when the feedback path length between the said transmitter and the said receiver is such that the reflected waves are generally in phase with and reinforcing the transmitted waves, said amplifier ceasing to oscillate when the feedback path length between the said transmitter and the said receiver is such that the reflected waves are approximately one-half wavelength out of phase with the transmitted waves so that the reflected waves are generally cancelling the transmitted waves, the oscillations ceasing when the reflected waves are about one-quarter wavelength out of phase with the transmitted waves; a detector means responsive to the presence of said oscillations which changes the state of a relay means to control an external load.

2. An acoustic distance measuring system as in claim 1 wherein the detector circuit is responsive to voltage changes at the amplifier output.

3. An acoustic distance measuring system as in claim 1 wherein the detector circuit is responsive to the characteristic oscillation frequency of the amplifier.

4. An acoustic distance measuring system as in claim 1 wherein a bandpass filter is employed to pass only the characteristic oscillation frequency of the amplifier.

5. An acoustic distance measuring system as in claim 1 wherein acoustic guides are employed to control the size and shape of the detection field.

* * * * *